United States Patent
Xiao

(10) Patent No.: US 11,243,920 B2
(45) Date of Patent: Feb. 8, 2022

(54) DISTRIBUTED DATABASE SYSTEM, TRANSACTION PROCESSING METHOD, LOCK SERVER AND STORAGE MEDIUM

(71) Applicant: Tencent Technology (Shenzhen) Company Limited, Guangdong (CN)

(72) Inventor: Tao Xiao, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 266 days.

(21) Appl. No.: 16/251,401

(22) Filed: Jan. 18, 2019

(65) Prior Publication Data

US 2019/0155795 A1    May 23, 2019

Related U.S. Application Data

(63) Continuation of application No. PCT/CN2017/106568, filed on Oct. 17, 2017.

(30) Foreign Application Priority Data

Oct. 24, 2016    (CN) .......................... 201610932469.8

(51) Int. Cl.
*G06F 16/21*    (2019.01)
*G06F 16/27*    (2019.01)
(Continued)

(52) U.S. Cl.
CPC .............. *G06F 16/211* (2019.01); *G06F 9/52* (2013.01); *G06F 16/27* (2019.01); *G06F 16/28* (2019.01)

(58) Field of Classification Search
CPC ........ G06F 16/211; G06F 16/27; G06F 16/28; G06F 9/52
See application file for complete search history.

(56) References Cited

U.S. PATENT DOCUMENTS 6,263,201 B1 *  7/2001  Hashimoto ............. H04L 29/06
                                                   370/345
7,814,494 B1 * 10/2010  More ...................... G06F 9/526
                                                   718/104
(Continued)

FOREIGN PATENT DOCUMENTS

CN    101273333 A    9/2008
CN    102135980 A    7/2011
(Continued)

OTHER PUBLICATIONS

Office Action dated Nov. 1, 2019 for Chinese Application No. 201610932469.8 with concise English Translation, 10 pages.
(Continued)

*Primary Examiner* — Huawen A Peng
(74) *Attorney, Agent, or Firm* — Crowell & Moring LLP

(57) ABSTRACT

A distributed database system may include storage layer. The storage layer may partition data and store the partitioned data in a distributed database. The system may further include access layer. The access layer may receive a transaction, identify target data corresponding to the transaction, and generate a lock request to lock the target data included in the partitioned data. The system may further include lock service layer. The lock service layer may identify, based on the lock request, a lock status for the target data according to a lock record for the target data. The lock service layer may lock, in response to the lock status being in an unlocked state, the target data. The lock service layer may block, in response to the lock status being in a locked state, the lock request and store the lock request in a queue.

20 Claims, 10 Drawing Sheets

(51) Int. Cl.
    *G06F 16/28*     (2019.01)
    *G06F 9/52*     (2006.01)

(56) References Cited

U.S. PATENT DOCUMENTS

| | | | | |
|---|---|---|---|---|
| 2007/0040699 | A1* | 2/2007 | Khairullah | G06Q 30/08 |
| | | | | 340/6.12 |
| 2007/0198599 | A1 | 8/2007 | Tobies | |
| 2007/0282838 | A1* | 12/2007 | Shavit | G06F 9/3834 |
| 2008/0288497 | A1* | 11/2008 | Watanabe | G06F 16/2358 |
| 2015/0261563 | A1* | 9/2015 | Guerin | G06F 9/466 |
| | | | | 707/703 |
| 2015/0347243 | A1* | 12/2015 | Guerin | G06F 15/17331 |
| | | | | 709/212 |
| 2016/0314162 | A1* | 10/2016 | Tarta | G06F 16/2336 |
| 2017/0192863 | A1* | 7/2017 | Eluri | G06F 11/2033 |
| 2018/0074919 | A1* | 3/2018 | Lee | G06F 16/2379 |
| 2018/0075083 | A1* | 3/2018 | Lee | G06F 9/466 |

FOREIGN PATENT DOCUMENTS

| | | |
|---|---|---|
| CN | 102831156 A | 12/2012 |
| CN | 103036717 A | 4/2013 |
| CN | 103297456 A | 9/2013 |
| CN | 104065636 A | 9/2014 |
| CN | 104239418 A | 12/2014 |
| CN | 105608086 A | 5/2016 |
| CN | 105955804 A | 9/2016 |
| WO | WO 2016/078423 A1 | 5/2016 |

OTHER PUBLICATIONS

English translation of International Search Report, issued in International Application No. PCT/CN2017/106568, dated Jan. 16, 2018, pp. 1-2, State Intellectual Property of the P.R. China, Beijing, China.

* cited by examiner

DISTRIBUTED DATABASE SYSTEM, TRANSACTION PROCESSING METHOD, LOCK SERVER AND STORAGE MEDIUM

CROSS REFERENCE TO RELATED APPLICATIONS

This application is a continuation of International Application PCT/CN2017/106568, filed Oct. 17, 2017, which claims priority to Chinese Patent Application No. 201610932469.8, filed on Oct. 24, 2016, both of which are incorporated herein by reference in their entirety.

TECHNICAL FIELD

The present disclosure relates to database technology, particularly a distributed database system, a transaction processing method, a lock server and a storage medium.

BACKGROUND

A distributed database may provide redundant and/or localized access to transaction information. Database operations involving distribute databases may be performed asynchronously. Asynchronous database operations may be prone to errors or vulnerable to malicious users.

SUMMARY

The embodiments of the present disclosure provide a system and method for distributed database access. In an example, a distributed database system may include storage layer. The storage layer may partition data and store the partitioned data in a distributed database. The system may further include access layer. The access layer may receive a transaction, identify target data corresponding to the transaction, and generate a lock request to lock the target data included in the partitioned data. The system may further include lock service layer. The lock service layer may identify, based on the lock request, a lock status for the target data according to a lock record for the target data. The lock service layer may lock, in response to the lock status being in an unlocked state, the target data. The lock service layer may block, in response to the lock status being in a locked state, the lock request and store the lock request in a queue. Additional or alternative aspects, features, and improvements are described in the description and drawings disclosed herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
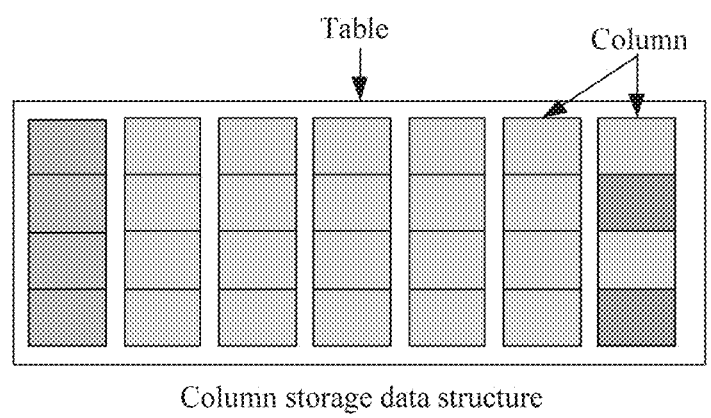
FIG. 1 is an optional diagram of a table structure of a database in the embodiments of the present disclosure.

The present disclosure will be further described in detail below with reference to the accompanying drawings and embodiments. While various embodiments are described herein, it will be apparent to those of ordinary skill in the art that many more embodiments and implementations are possible. Accordingly, the embodiments described herein are examples, not the only possible embodiments and implementations.

A distribute database may include a database which is distributed throughout multiple physical or virtual nodes. When a local database is updated with information on one node, the distributed database may synchronize with other nodes to keep the distributed database up to date. A distributed database may support transactional access. When recording and accessing a distributed database, by taking transactions committed to the distributed database as an example, in order to complete a transaction, the following database operations included in the transaction may be executed: transferring money from a consumer account, and transferring the transferred money to a merchant account.

Since data of a distributed database is stored in a distributed manner, the responses of the distributed database to external database operations may be asynchronous i.e., a database operation behind may be executed prior to a database operation in front, and therefore, it is difficult to support a transactional-based database scheme.

Between the database operations included in the above transaction, an error may be inserted into the operation on the consumer account or the merchant account. For example, before a consumer's payment record purchased with a sum of money is written into a distributed database by using a database operation, the payment record repeatedly purchased by the same sum of money may be written into the distributed database prior to a payment record generated earlier, thereby presenting a payment bug that the consumer uses the same sum of money to make multiple purchases.

There is still no effective solution for related technologies for supporting the implementation of the transactional access manner in a distributed database.

Before the embodiments of the present disclosure are further described in detail, the words and terms involved in the embodiments of the present disclosure are described.

1) A database system may include hardware, a database (data stored in a specific organization format) and/or a combination of hardware and software.

2) A database may include organized sharing-supporting collection of data stored in a computer.

The databases involved herein may include relational databases, non-relational databases and/or distributed databases. A relational database may include a database that is managed and stored based on a relationship (such as a relational model) between data. A distributed database may include a database that logically organizes data as a whole and stores data in physical locations in a distributed manner.

It can be understood that when data of the relational database is stored in a distributed manner, a distributed relational database is formed, and when data of the non-relational database is stored in a distributed manner, a distributed non-relational database is formed. The distributed database described below is not included in any of the above-mentioned types of distributed databases.

3) A database transaction, referred to as a transaction herein, is a program execution unit that accesses and updates various data items in a database, and includes a series of database operations, such as searching data, adding data, modifying data and deleting data.

Here, a relational database according to the embodiments of the present disclosure will be firstly described.

A relational database is a database set up based on a relational model. It uses mathematical concepts and methods such as set algebra to process data in the database. Various entities in the real world and various connections between entities are represented by relational models. The relational model essentially refers to a two-dimensional table model, so the relational database is a data organization made up of two-dimensional tables and relations therebetween.

The relational model constitutes the traditional standard for data storage at present. For example, Structured Query Language (SQL) is a relational database-based language that executes retrieval and manipulation of data in the relational database.

As shown in FIG. 1, a relational database includes one or more tables, a table is a collection of data organized in rows and columns, and the data organization form shown in FIG. 1 can be applied to the relational database.

For example, there may be a table named authors for author information. Each column contains a specific type, such as an author's family name. Each row contains all information about a specific author: name, address and the like. In the relational database, a table is a relation, and one relational database may contain multiple tables.

The relational database supports access to data in a transaction manner. A transaction includes a series of operations that need to be executed on the database, for example, including: retrieval (i.e., query) and updating (adding data, deleting data and modifying existing data).

Generally, transactions involve the updating of data in the database. When the database responds to a transaction, it includes three stages: starting the transaction, executing operations included in the transaction, and committing the transaction, i.e., committing the data updated by the operation to the database. After the transaction is started, a client executes a series of operations included in the transaction on target data (data that needs to be accessed in the database when executing the transaction is called target data herein) in the database. At the completion of the execution of the operation, the updated data is committed to the database (generally, the transaction involves updating of data). Of course, it is also possible to roll back the transaction to cancel a series of operations executed on the data after the transaction is started, which is equivalent to no update of the data.

In order to ensure the integrity of operations of a transaction on the database, in a traditional relational database transaction mechanism, if an access to the database in a transaction manner is supported, atomicity and isolation are required, which will be described below separately.

1) The atomicity of a transaction means that operations included in the transaction, as a logical unit of work of the database, are related and are executed one after the other, that is, they are be executed all at once, which is called transaction committed, or not executed at all, which is called transaction cancelled (or transaction aborted). After the execution of a transaction is completed, all updates to the data are visible to other transactions or not updated at all.

For example, if a transaction is considered as a program, it is either completely executed or not executed at all, that is, a series of operations of the transaction are either completely applied to the database or do not affect the database at all.

2) The isolation of transactions means that concurrent transactions are isolated from one other. That is, operations within a transaction and data being accessed are be blocked to prevent other transactions from updating the data. Isolation is a security guarantee on conflicts between concurrent transactions.

In an optional embodiment of the present disclosure, it is possible to isolate the concurrent transactions by locking the data accessed by the transaction, so as to avoid the occurrence of abnormal conditions.

For a database system that uses a single machine (using a single storage server to store data), since only one storage server (also regarded as a storage node) is used to store data, the isolation and atomicity of the transaction can be implemented in a serial or single-machine multi-task scheduling manner, which will be described with reference to FIG. 2 below.

Figure 2:
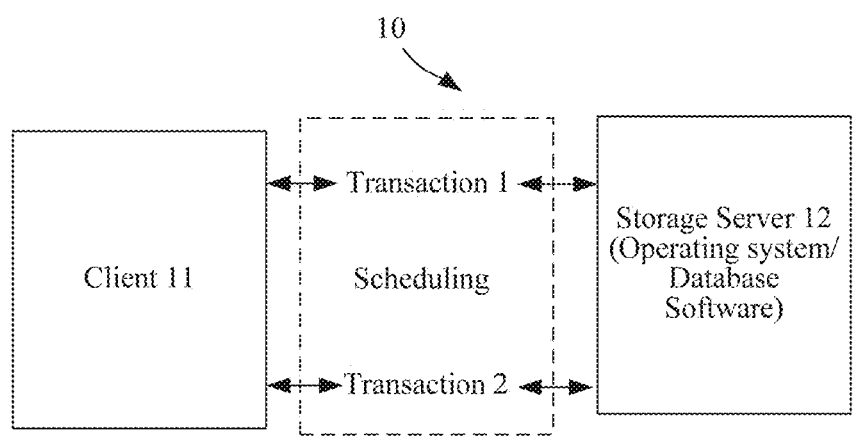
FIG. 2 is an optional architectural diagram of a standalone database system provided in the embodiments of the present disclosure.

FIG. 2 is an optional structure diagram of a database system 10 provided in the embodiments of the present disclosure. data is stored in a single database (formed by deploying database in an operating system running in the storage server 12) running on the storage server 12, and therefore, objects manipulated by each transaction always point to the data in the database of the storage server 12. In order to implement the isolation of transactions, when transactions (such as transaction 1 and transaction 2 in FIG. 2) initiated by a client 11 manipulate the same data in the storage server 12, processing is performed in a serial or scheduling manner.

For the convenience of description, the storage server 12 responding to multiple concurrent transactions of a client 11 shown in FIG. 2 is illustrated below. It is to be understood that the multiple transactions initiated by multiple clients are applicable to the following description.

For example, transaction 1 and transaction 2 are processed according to a specific order. Assuming that transaction 1 initiated by a client 11 precedes transaction 2 initiated by the client 11, in the order of transaction 1-transaction 2, database deployed by the storage server 12 firstly executes transaction 1: executes operations included in transaction 1, and commits updates of transaction 1 on data to a database, thus ending transaction 1; and then executes operations included in transaction 2, and commits updates of transaction 2 on data to a database, thus ending transaction 2.

For another example, transactions are scheduled for responding according to a preset scheduling algorithm, and the transactions are scheduled in turn according to the priorities of different clients. Assuming that transaction 1 and transaction 2 are correspondingly from client 1 and client 2 and client 2 has higher priority than client 1, then transaction 2 has higher scheduling priority than transaction 1, responding transactions are scheduled in the order of transaction 2-transaction 1, database deployed by the storage server 12 firstly executes transaction 2: executes operations included in transaction 2, and commits updates of transaction 2 on data to a database, thus, ending transaction 2; and then executes operations included in transaction 1, and commit updates of transaction 1 on data to the database, thus ending transaction 1.

The processing manner for multiple transactions can be implemented with reference to the above solution. It can be seen that for a database system using a single storage server, the isolation between transactions can be implemented in a serial or scheduling manner, however, for a distributed database system, since the same data (for example, account data of a client) may be distributed in multiple storage servers, it is not possible to simply process the transactions in the above serial or scheduling manner.

Figure 3A:
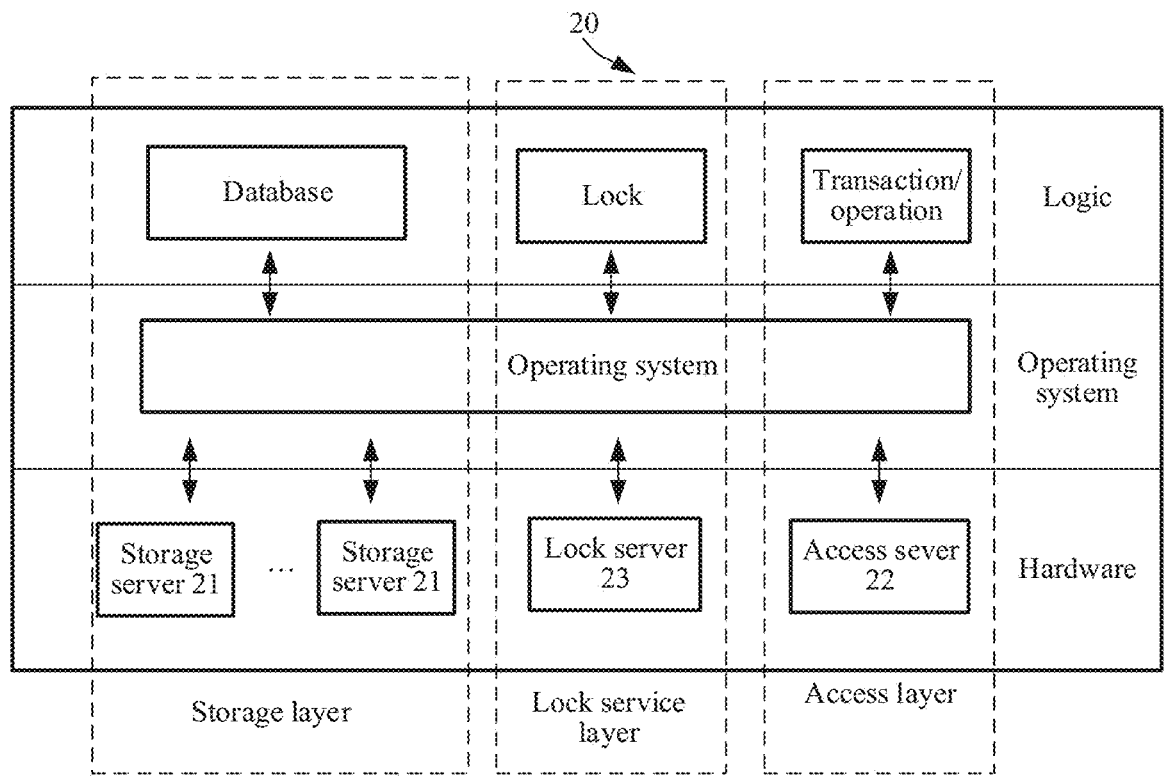
FIG. 3A is an optional structure diagram of a distributed database system provided in the embodiments of the present disclosure.

FIG. 3A is a structure diagram of a distributed database system 20. The database system 20 may be composed of hardware, a database (data stored in a specific organization format), which are described below.

Hardware refers to various physical devices that constitute a computer system, including external devices required for storage. The hardware configuration should meet the needs of the entire database system.

A database is an organized and shareable collection of data that is stored in a computer for a long time. The data in the database can be organized, described and stored according to a certain relational model. It has less redundancy, higher data independence and expansibility, and can be shared by various clients.

Logic includes an operating system, database such as DBMS (database Management System), and application programs. The database works under the support of the operating system, organizes and stores data, and acquires and maintains data. Its main functions include: definitions of data organization formats, data access, database operation management, and establishment and maintenance of the database.

An optional architectural diagram of a distributed database system 20 exemplarily shown in FIG. 3A will be described. From an abstract functional level, as an example, a storage layer, a lock service layer and an access layer may be included. The composition of various abstract functional layers will be described below. Each layer may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each circuitry may include memory hardware, such as a portion of a non-transitory storage medium, for example, that comprises instructions executable with a processor to implement one or more of the features of the layers. When any one of the layers includes the portion of the memory that comprises instructions executable with a processor, the layer may or may not include the processor. In some examples, each layer may just be the portion of the memory or other physical memory that comprises instructions executable with the processor to implement the features of the corresponding layer without the layer including any other hardware. Because each layer includes at least some hardware even when the included hardware comprises software, each layer may be interchangeably referred to as a layer circuitry.

Multiple storage servers 21 form a storage cluster and form the storage layer part, database (such as distributed relational database and distributed non-relational database) is deployed in an operating system running on the storage server 21 to form a database, and data is stored in a distributed manner in the database running in multiple storage servers.

The access server 22, which forms an access service layer part, as an entry to the distributed database system, is responsible for responding to the access of a client and running various types of logic in a running operating system. The access server 22 is configured to receive a transaction or operation (the operation here refers to a non-transaction operation, which is to say that various operations are not related) initiated by the client, interact with the storage server and a lock server, and implement response to the transaction or operation initiated by the client, including requesting the lock server to lock target data of the transaction, committing the transaction or operation initiated by the client to the storage server for the storage cluster to execute, and when necessary, returning a result to the client that initiates the transaction or operation.

The lock server 23, which forms the lock service layer part, is configured to maintain a lock record of data stored in the storage cluster, i.e., data in a locked state recorded in the storage cluster). Lock request processing logic is deployed in an operating system running in the lock server, a response to a lock request of the transaction on target data is made according to the state of the target data that the transaction needs to access, i.e., whether the target data is in the locked state, or the lock request of the transaction on the target data is blocked (i.e., the response is ended), and the lock request of which the response is ended is queued, i.e., the lock request of the transaction on the target data is stored in a queue corresponding to the target data.

Figure 3B:
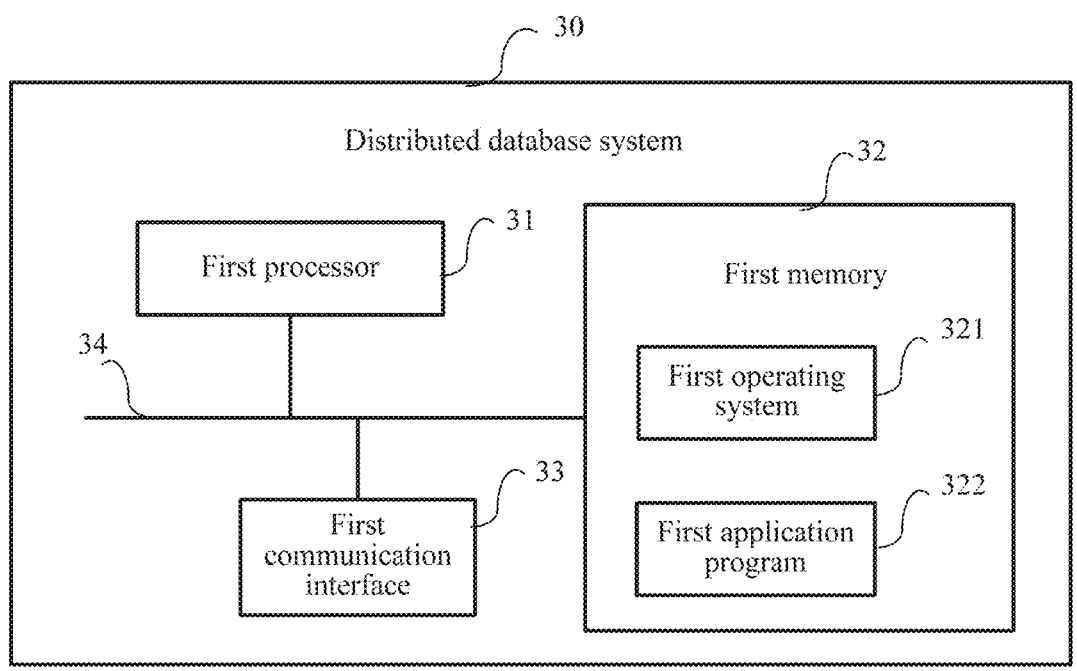
FIG. 3B is an optional hardware structure diagram of a distributed database system provided in the embodiments of the present disclosure.

As an example, refer to FIG. 3B, which shows an optional hardware structure diagram of the distributed database system shown in FIG. 3A. The distributed database system 30 shown in FIG. 3B includes: a first processor 31, a first memory 32 and a first communication interface 33. The various components in the distributed database system 30 are coupled together by a first bus system 34. It can be understood that the first bus system 34 is configured to implement connections and communications between these components. The first bus system 34 includes a power bus, a control bus and a status signal bus in addition to a data bus. However, for clarity, various buses are marked as the first bus system 34 in FIG. 3B.

It can be understood that, since the distributed database system 30 is composed of multiple types of servers (such as storage servers, access servers and lock servers) and each type of servers can also be multiple according to actual implementation needs, the components shown in FIG. 3B are merely examples and do not represent the quantity. The components can be arranged in physical locations in a distributed manner, and connected by the first bus system 34 (such as cables and optical fibers) to logically form an integral body. At this time, the first bus system 34 may implement communication between first application programs 322 (such as databases) arranged in a distributed manner via the first communication interface 33.

It can be understood that the first memory 32 may be a volatile memory or a non-volatile memory, and may also include both volatile and non-volatile memories. The non-volatile memory may be a read only memory (ROM) or a programmable read-only memory (PROM). The first memory 32 described in the embodiments of the present disclosure is intended to include but not limited to these and any other suitable types of memories.

The first memory 32 in the embodiments of the present disclosure is configured to store various types of the first application programs 322 and a first operating system 321 to support the operation of the distributed database system 30.

A transaction processing method disclosed by the embodiments of the present disclosure may be applied in the first processor 31, or implemented by the first processor 31. The first processor 31 may be an integrated circuit chip having signal processing capabilities. In an implementation process, each step of the above method may be completed by an integrated logic circuit of hardware in the first processor 31 or an instruction in the form of logic. The above-mentioned first processor 31 may be a general-purpose processor, a digital signal processor (DSP), or another programmable logic device, discrete gate or transistor logic device, a discrete hardware component, or the like.

The first processor 31 may implement or execute methods, steps and logic block diagrams provided in the embodiments of the present disclosure. The general-purpose processor may be a microprocessor or any conventional processor or the like. A module may be located in a storage medium, the storage medium being located in the first memory 32. The first processor 31 reads information in the first memory 32 and completes the steps of the foregoing method in combination with its hardware.

Understandably, the lock server can separately maintain queues for multiple pieces of target data, and each queue stores lock requests of different transactions on target data, for example:

Queue 1: a lock request of transaction 1 on data 1; a lock request of transaction 2 on data 1.

Queue 2: a lock request of transaction 3 on data 2; a lock request of transaction 4 on data 2.

The description of different locking situations of the target data of the transaction initiated by a client will be described.

Situation 1) The target data is not in a locked state.

When the target data corresponding to a transaction is not in the locked state, in order to avoid conflicts caused by accessing the transaction by other transactions or operations when the storage cluster is executing the transaction, the lock server instructs the storage cluster to lock the target data on the transaction, for example, by sending an instruction lock message on the target data to the storage cluster, and when the storage cluster returns the locked target data, the lock server locally adds a lock record of the target data to record that the target data is in the locked state.

Exemplarily, locking the target data refers to adding a transaction lock of the corresponding transaction for the target data, so that the target data can be accessed only when the storage cluster executes the transaction, so as to block the storage cluster from accessing the target data when executing other transactions or operations, thereby achieving the effect that the transaction "monopolizes" the target data for database operations.

In addition, since the target data of the transaction is not in the locked state, the target data can be accessed at any time, and therefore, the lock server instructs the access server to commit the transaction to the storage cluster, causing the storage cluster to execute the transaction on the locked targeted data.

When completing the execution of the transaction committed by the access server on the locked target data, the storage server may notify the completion of the execution of the transaction by sending a lock cancel message on the target data to the lock server, so as to request releasing lock on the target data, the lock server determines that the execution of the transaction is completed according to the message, and if no other transaction needs to access the target data, then the lock server may confirm the lock cancel message from the storage cluster and instruct the storage cluster to release lock on the target data.

The transaction being accessed in a locked target data manner avoids the possibility of errors due to conflicts caused by the access of other transactions or operations, thereby implementing the atomicity of the transaction.

Situation 2) the target data is in a locked state.

This is because the target data has been locked on a transaction (known as a historical transaction) initiated before the current transaction. Since the target data can not be accessed, in order to prevent errors when the storage cluster executes the transaction, the lock server blocks the lock request of the transaction on the target data sent by the access server.

For example, the lock server does not return, to the access server, a confirmation message that the transaction can be committed to the storage cluster, or notifies the access server to wait for an indication before committing the transaction to the storage cluster.

In addition, the lock server also adds the lock request of the transaction on the target data to the queue corresponding to the target data, and waits for the storage cluster to send a lock release message on the target data to the lock server. If the locking release message is received, it indicates that the storage cluster has executed the historical transaction and requests to release the lock. At this time, since the queue of the target data is not empty, the lock server instructs to continue sending a lock notification message on the transaction to the storage cluster, so that the storage cluster continues locking the target data on the transaction.

For the storage cluster, the transaction's identity can be used to distinguish lock operations on different transactions, so as to determine which transactions the locked target data can be accessed by.

The lock server extracts the lock request from the queue of the target data, indicates that the access server can commit the transaction corresponding to the extracted access request to the storage cluster, and continues extracting, when determining that the transaction has been executed by the storage cluster according to the lock cancel message sent by the storage cluster, the access request in the queue until the lock cancel message sent by the storage cluster is received and the queue is empty. At this time, no transaction needs to access the target data, the lock server confirms to the storage cluster that lock of the target data can be released, and the lock record of the target data maintained by the lock server is removed.

By means of queues, the lock requests of the transaction are sequentially responded, thereby avoiding the situation of conflicts when the transactions access the same data, and implementing the isolation between transaction accesses.

In addition, the client also has a situation of initiating an operation to a distributed database system, which will be described below.

When the client initiates an operation to the distributed database system, the access server receives the operation as an entry, commits the operation initiated by the client to the storage cluster, and correspondingly processes according to the operation execution situation of the storage cluster.

Situation 1) the storage cluster succeeds in executing the operation.

This indicates that the target data that the operation needs to access is not currently in the locked state, which is a relatively common situation in the distributed database. In general, operational accesses initiated by the client on the distributed database system are more than transactional accesses. If the access server directly commits operations to the storage cluster, the operations can be executed successfully in most cases. Such manner of blindly committing operations to the storage cluster while ignoring whether the target data is locked can save an interaction process with the lock server and enhance the processing efficiency of operations.

2) the storage cluster fails in executing the operation.

When the storage cluster fails in executing the operation, the storage cluster returns an error message to the access server, indicating that the error is due to the fact that the server has locked the target data on the transaction (known as a historical transaction) initiated prior to the current transaction.

When learning that the target data of the initiated operation has been locked according to the error message, the access server may convert the previously initiated operation into a single operation transaction (namely the transaction only including the operation initiated by the client), and requests the lock server to lock the target data that the transaction needs to access.

In order to prevent errors when the storage cluster executes the transaction, the lock server blocks the lock request of the single operation transaction on the target data sent by the access server.

For example, the lock server does not return, to the access server, a confirmation message that the transaction can be committed to the storage cluster, or notifies the access server to wait for an indication before committing the transaction to the storage cluster.

In addition, the lock server also adds the lock request of the single operation transaction on the target data into the queue corresponding to the target data, and waits for the storage cluster to send a lock release message on the target data to the lock server. If the lock release message is received, it indicates that the storage cluster has finished responding to the access server on the historical transaction and requests to release lock. At this time, since the queue of the target data is not empty, the lock server instructs to continue sending a lock notification message on the transaction to the storage cluster, so that the storage cluster continues locking the target data on the transaction.

For the storage cluster, the transaction's identity can be used to distinguish lock operations on different transactions, so as to learn which transactions the locked target data can be accessed by.

The lock server extracts the lock request from the queue of the target data, indicates that the access server can commit the transaction corresponding to the extracted access request to the storage cluster, and continues extracting, when determining that the transaction has been executed by the storage cluster according to the lock cancel message sent by the storage cluster, the access request in the queue until the lock cancel message sent by the storage cluster is received and the queue is empty. At this time, no transaction needs to access the target data, the lock server confirms to the storage cluster that lock of the target data can be released, and the lock record of the target data maintained by the lock server is removed.

When the target data of the operation is locked, the operation is converted into the single operation transaction, and the target data is accessed in a transaction manner, thus implementing the isolation between the operation and the transaction since the transaction sequentially accesses the locked target data.

Figure 4A:
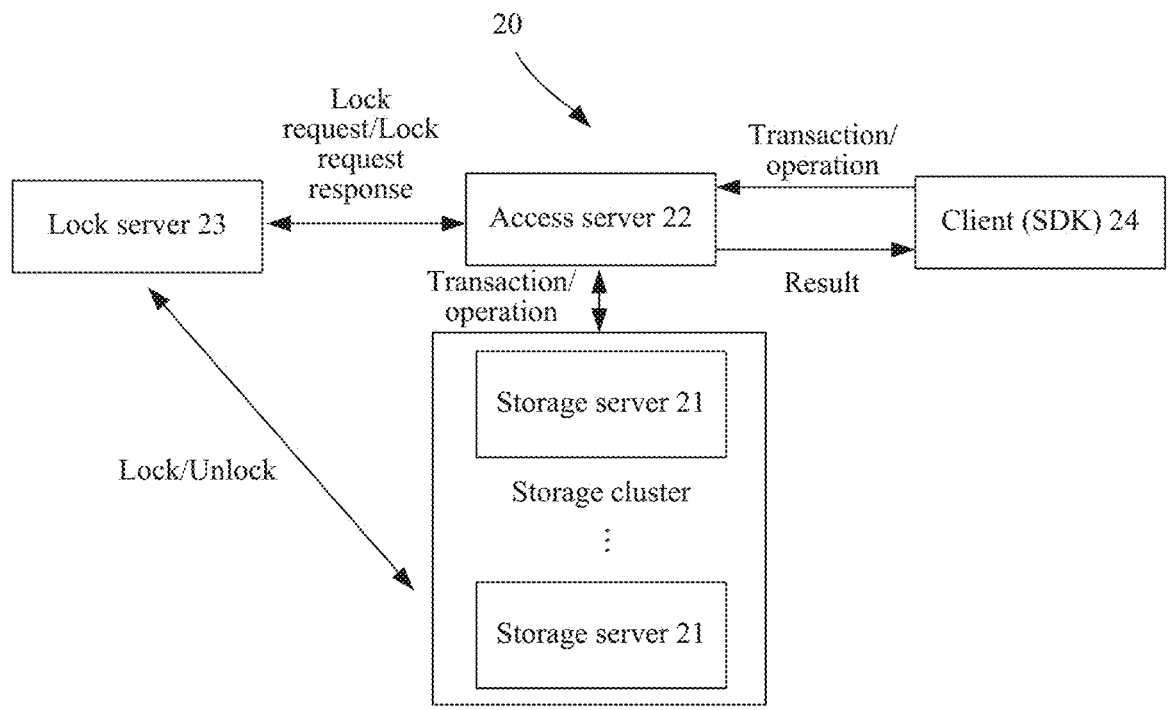
FIG. 4A is an optional architectural diagram of a distributed database system provided in the embodiments of the present disclosure.

In an optional hardware structure diagram of a distributed database system shown in FIG. 4A, when the distributed database system uses multiple storage servers (also referred to as storage nodes) to store data, isolation and atomicity of the transaction are achieved by setting a lock server in the distributed database system.

The distributed database system 20 shown in FIG. 4A includes a storage cluster composed of a plurality of storage servers 21, an access server 22, a lock server 23, and a client 24 accessing the distributed database system, which will be respectively described below.

The storage servers 21 in the storage cluster are configured to store data in a distributed manner. The data is firstly partitioned before being stored in the storage servers 21, and the partitioned data is stored in the multiple storage servers in a distributed manner.

For example, for a table named authors for author information in a table format of FIG. 1, different rows or columns may be distributed in different storage servers, and the data may be partitioned in different partitioning manners.

For example, the partitioning manner is Horizontal Partitioning. This type of partitioning partitions rows of the table. In this way, data sets divided by physical columns in different partitions are combined to perform individual division (single partitioning) or collective division (1 or more partitions). All the columns defined in the table can be found in each data set, so the characteristics of the table are still maintained.

For instance, a table containing a 10-year invoice record can be partitioned into ten different partitions, each partition containing a one-year record.

For another example, Vertical Partitioning. This partitioning manner is generally to reduce the width of the table by dividing the table vertically, so that some specific columns are divided into specific partitions, each partition containing the rows corresponding to the columns.

For instance, a table containing text columns (columns that save characters) and BLOB columns (columns that save binary data). Assuming that these text columns and BLOB columns are accessed infrequently, then these infrequently used text columns and BLOB columns are divided into another separate partition, which can increase the access speed while ensuring data dependency.

In addition, the storage cluster also locks the data according to an instruction of the access server, and notifies the access server that lock on the transaction or operation committed by the access server can be cancelled after the transaction or operation is ended.

The access server is configured to uniformly process transactions or operations initiated by different clients. The client may be provided with a software development kit (SDK). The SDK actually forms a client-oriented interface layer of the distributed database system, and is configured to initiate a transaction or operation to the distributed database system and acquire logic of a corresponding processing result.

For example, for clients for online payment, when a user 1 makes an online transfer to a user 2, a client of the user 1 initiates such a transaction: operation 1, transferring a sum of money from an account of the user 1; operation 2, transferring a sum of money to an account of the user 2.

Figure 4B:
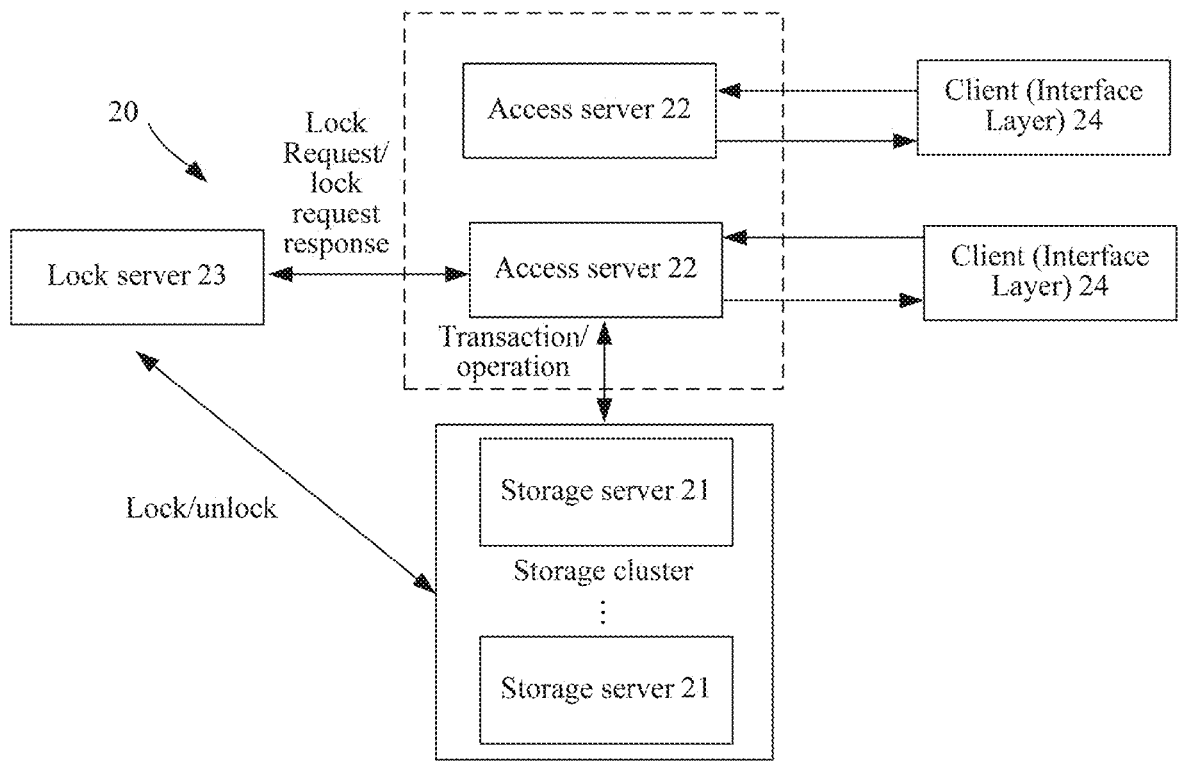
FIG. 4B is an optional architectural diagram of a distributed database system provided in the embodiments of the present disclosure.

In addition, it should be pointed out that only one access server 22 is shown in FIG. 4A. In practical applications, as shown in FIG. 4B, multiple access servers 22 may be arranged in the distributed database system. Each access server 22 is directed to process a transaction or operation initiated by a specific group of clients 24.

For example, a specific group of clients 24 can be divided from dimensions such as the type of the client and a region to which the client belongs, thereby achieving the load balancing effect of each access server.

Figure 5A:
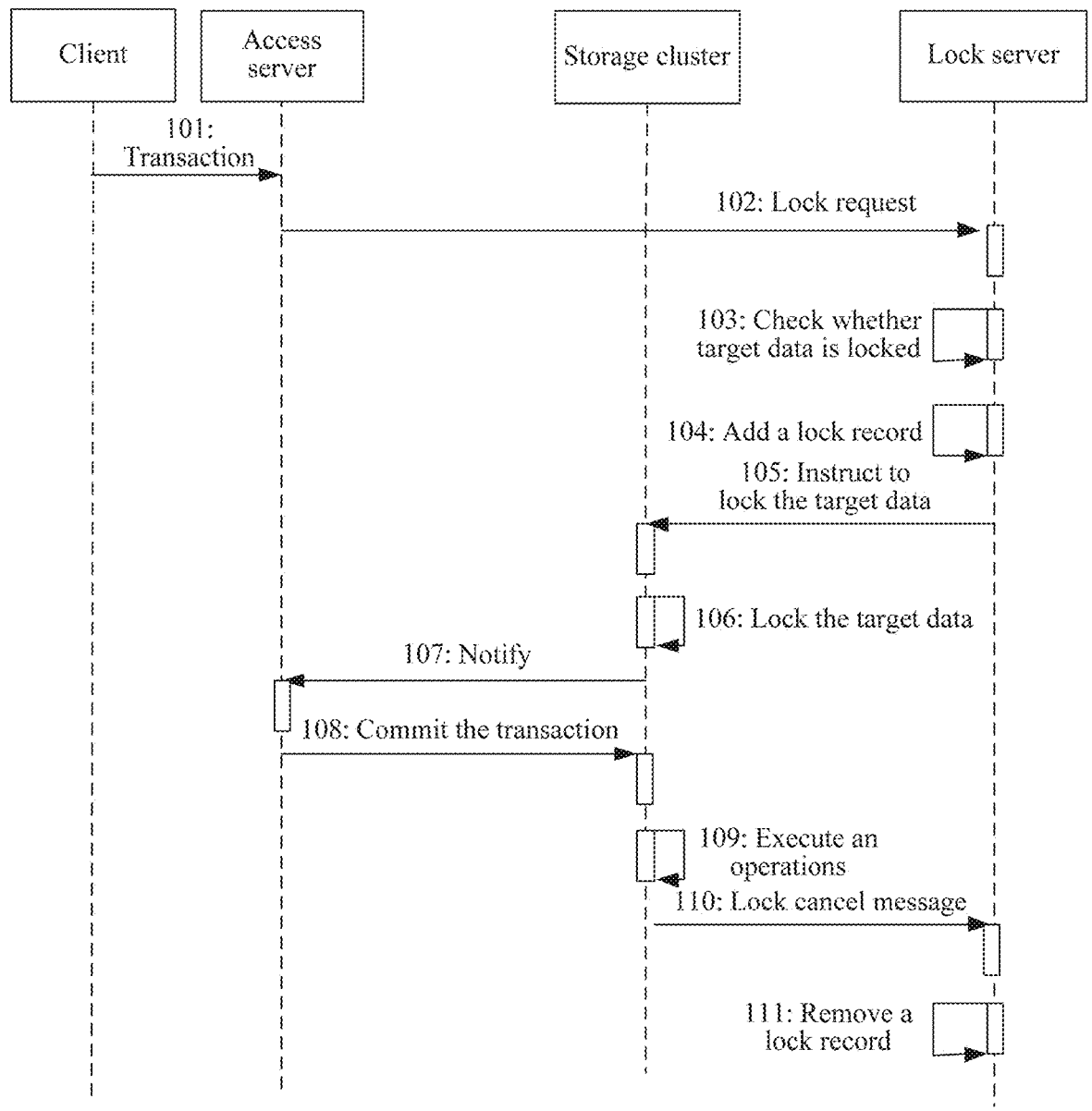
FIG. 5A is an optional flow diagram of a transaction processing method provided in the embodiments of the present disclosure.

When the distributed database system processes a transaction initiated by the client, refer to an optional flow diagram of a transaction processing method shown in FIG. 5A.

A user initiates a transaction to the distributed database system via a client (including an SDK, configured to initiate a transaction to an access server) (step 101), and the access server as an entry commits a lock request to a lock server on target data of a transaction (step 102). The lock server retrieves a lock record of local data and detects whether the target data is in a locked state (step 103), and here, assuming that retrieving that the target data is not locked, confirms to the access server that the target data can be locked, and adds a lock record that the target data is in a locked state into the lock server (step 104).

For the target data, the client can commit, when committing the transaction to the distributed database system, an index of the target data of the transaction in a database, so that the access server learns the target data that the transaction needs to access, and commits a lock request on the target data to the lock server.

The lock server sends a lock notification message to a storage cluster, instructing the storage cluster to lock the target data stored in a distributed manner in the storage servers (step 105). The storage cluster locks the target data (step 106), which means that the storage cluster, through running database(s), only opens a permission to accessing (querying and updating) the target data to the current transaction, blocks other transactions and operations from accessing the target data.

After learning that the target data is locked, the lock server notifies that the access server can access the target data to the storage cluster (step 107), and the access server commits the transaction to the storage cluster (step 108). In the period that the target data is locked, the storage cluster executes the currently responded transaction through database(s), including executing operations included in the transaction to the target data, committing updates on the target data to the database running in the storage cluster, and ending the transaction after the commission is successful (step 109).

After the transaction is ended, the storage cluster sends a lock cancel message on the target data to the lock server (step 110), indicating that the transaction has been ended and lock on the target data can be cancelled, and the lock server removes the lock record of the target data (step 111).

It can be seen that the target data that the transaction needs to access is locked by the lock server, so that only the current responding transaction can manipulate the target data, for example, after the target data is locked for transaction 1, only transaction 1 can access the target data, even if the client initiates a transaction of the same target data, because the transaction does not have a permission to access the target data, conflicts caused by manipulating the target data by other operations or operations are avoided, thereby implementing the isolation between transactions.

Similarly, target data in a locked state can not be accessed by operations initiated by the client subsequently, so the possibility of accessing the target data by other inserted operations when executing an operation included in the transaction is avoided, thereby implementing atomicity of the transaction.

It should be noted that if the target data that the transaction initiated by the client needs to access is different, there is no conflict between lock of the lock server on different target data. However, in practical applications, cases that target data accessed by two or more transactions initiated by the client is the same will occur.

For example, the lock server locks data 1 on transaction 1 initiated by the client, and target data of transaction 2 and transaction 3 initiated by the client subsequently is also data 1. A solution for blocking and queuing a lock request is provided for such a situation, which is described below with reference to an optional flow diagram of a transaction processing method shown in FIG. 5B.

A user initiates a transaction to a distributed database system via a client (including an SDK, configured to initiate a transaction to an access server) (step 201), and the access server as an entry commits a lock request to a lock server on target data of the transaction initiated by the client (step 202).

For the target data, the client can commit, when committing the transaction to the distributed database system, an index of the target data of the transaction in a database, so that an access server learns the target data that the transaction needs to access, and commits a lock request on the target data to a lock server.

The lock server retrieves a lock record of local data and detects whether the target data is in a locked state (step 203), and here, assuming that retrieving that the target data is in the locked state, confirms to the access server that the target data can not be locked (step 204), blocks the lock request of a service on the target data, and stores the lock request in a queue corresponding to the target data (step 205) until a storage cluster has completed the execution of a historical transaction committed by the access server before step 201 on the currently locked target data, and sends a lock cancel message on the target data to a lock server (step 206), and the lock server determines that the target data has been in an accessible state in the storage cluster.

For the lock request in the queue, the lock server executes the following processing: extracts a lock request (the extracted lock request can no longer be saved in the queue) from the queue in a first-in first-out order, and sends a lock notification message on the transaction to the storage cluster (step 207), instructing the storage cluster to continue locking the target data on the transaction. The difference from the previous locking is to add the transaction initiated by the client in step 201 on the target data and notify that the access server can commit the transaction corresponding to the extracted lock request to the storage cluster (step 208).

The access server commits the corresponding transaction (the transaction corresponding to the lock request extracted from the queue) to the storage cluster (step 209), and the storage cluster executes operations included in the corresponding transaction, and commits updates on the target data (step 210). After committing updated data to the database is successful, the transaction is ended, and the storage cluster sends a lock cancel message on the target data to the lock server (step 211).

The lock server sends a lock notification message to the storage server according to the lock request in the queue if there is still a lock request of other transactions on the target data in the queue, and instructs the storage cluster to continue maintaining the locked state of the target data, so as to continue executing the transaction corresponding to the lock request in the queue until the lock cancel message on the target data sent by the storage cluster is received. When the queue of the corresponding target data is empty, the lock server no longer sends the lock notification message on the target data to the storage cluster, and can remove the lock record of the target data (step 212).

For example, data 1 on transaction 1 initiated by the client is locked, and target data of transaction 2 and transaction 3 initiated by the client subsequently is also data 1. Since transaction 2 and transaction 3 only need to manipulate data 1, the lock server blocks lock requests of transaction 2 and transaction 3 on data 1, thereby forming such a queue as transaction 2 lock request-transaction 3 lock request. When the lock server receives a lock cancel message on data 1 from the storage cluster, it is determined that transaction 1 is ended.

If the lock server detects that there is still a lock request of transaction 2 on data 1 in the queue, the lock server sends a lock notification message to the storage cluster again to continue locking data 1, and notifies that the access server can commit transaction 2 to the storage cluster, and the storage cluster runs database logic to execute operations included in transaction 2 so as to update data 1, commits an update result of data 1 to the database, and sends a lock cancel message on data 1 to the lock server after the commission is successful.

When receiving the lock cancel message on data 1 from the storage cluster, the lock server determines that transaction 2 is ended, deletes the lock request of transaction 2 in the queue, sequentially extracts access requests of transaction 3, and sends a lock notification message to the storage cluster again to lock data 1, and the storage cluster runs database logic to execute operations included by transaction 3 so as to update data 1, commits an update result of data 1 to the database, and sends a lock cancel message on data 1 to the lock server after the commission is successful.

At this time, the lock server detects that there is no lock request in the queue of data 1, and then the lock server can remove the locked state of data 1. Because all the transactions corresponding to the lock request in the queue have been responded and the target data is "monopolized" in the responding process of each transaction, the isolation between transactions and the atomicity of the transactions are ensured.

Figure 5B:
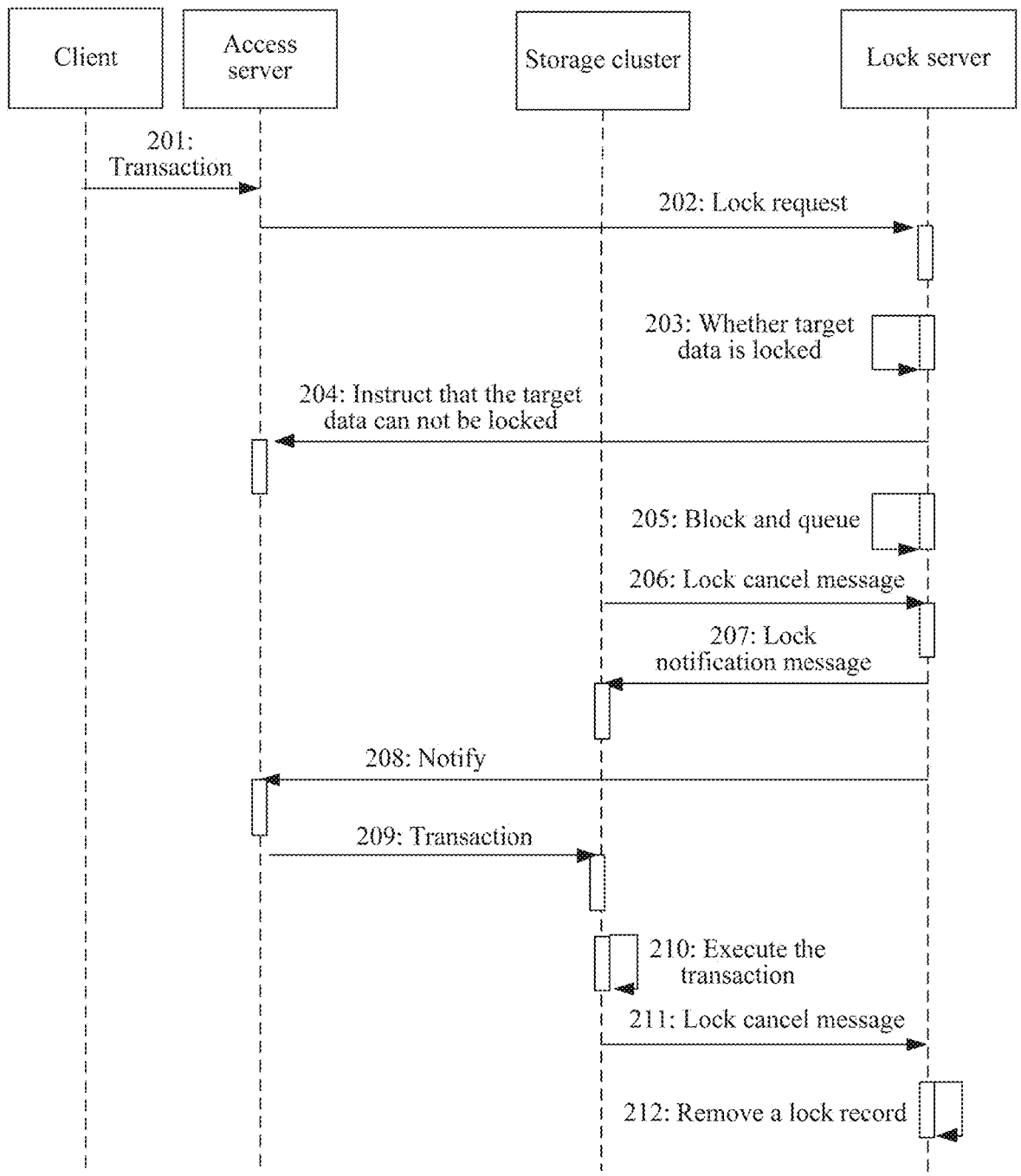
FIG. 5B is another optional flow diagram of a transaction processing method provided in the embodiments of the present disclosure.

When a distributed database system processes operations initiated by the client, since the operations here are non-transactional operations, there is no correlation between the operations, i.e., a result of one operation does not affect the other operation, and thus, the processing manner for the operations is different from FIG. 5A and FIG. 5B.

In practical applications, accesses to a distributed database system are mostly initiated in the form of operations. In other words, in the case where data in a locked state is a small amount of data, as for operations initiated by the client, the access server can bypass the lock server and directly commit the operations to the storage cluster. Most operations (data that the operations need to access is not locked) may be directly executed by the storage cluster, while a few operations (data that the operations need to access is in the locked state since being accessed by a transaction) need queue processing, thereby enhancing the processing efficiency of operations. An optional flow diagram of a transaction processing method shown in FIG. 5C and FIG. 5D will be described below.

Figure 5C:
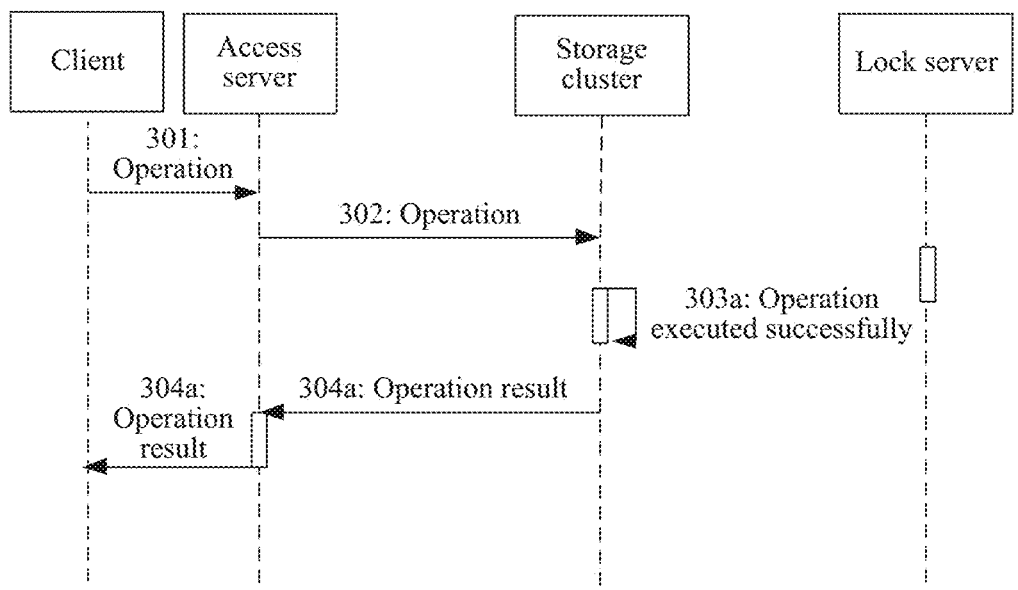
FIG. 5C is still another optional flow diagram of a transaction processing method provided in the embodiments of the present disclosure.

When an access server receives an operation initiated by a client at a client side (step 301), the access server commits the operation to a storage cluster (step 302), and the storage cluster performs, according to the lock situation of target data that the operation needs to access, different processing:

1) referring to FIG. 5C, if target data is not in a locked state, an operation can be successfully executed, for example, a storage cluster executes an operation on the target data through running database logic (step 303*a*), commits an operation result to a database operated by the storage cluster (for example, when the operation updates the target data) (step 304*a*), returns an operation result to an access server, and returns the operation result to a client via the access server.

Figure 5D:
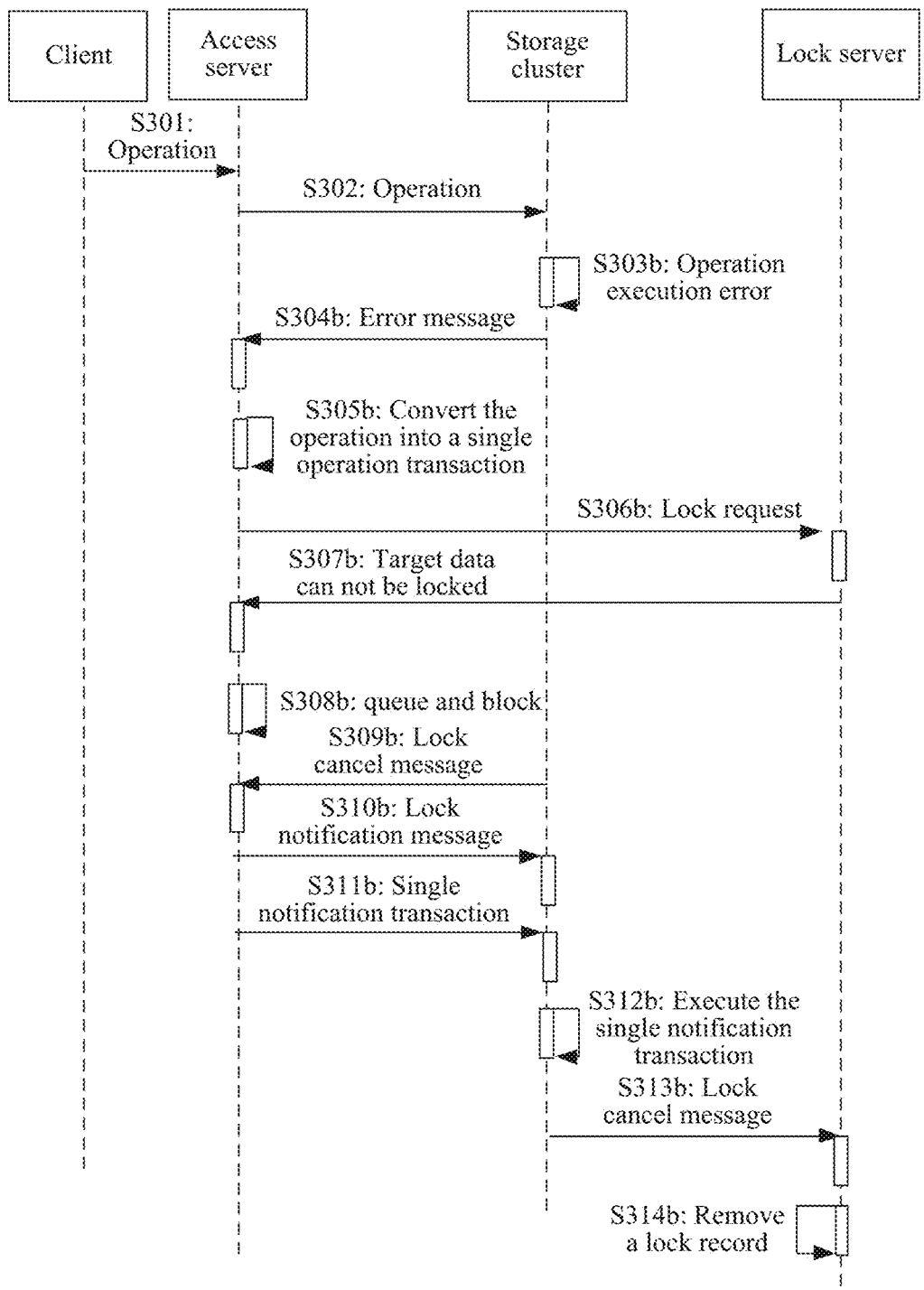
FIG. 5D is yet another optional flow diagram of a transaction processing method provided in the embodiments of the present disclosure.

2) referring to FIG. 5D, if target data is in a locked state, which indicates that a historical transaction is accessing the target data prior to a current transaction, then an error of an operation committed by an access server occurs (step 303*b*), correspondingly, a storage cluster detects that the data can not be manipulated and returns an error message to the access server (step 304*b*), and the access server learns that the target data of the initiated operation has been locked according to the error message and converts the operation initiated previously into a single operation transaction (step 305*b*).

A single operation transaction is formed by describing the operation by using code syntax of the transaction, and is different from a conventional transaction in that the single operation transaction only includes one operation, for example, as for a select operation, an optional example described by using codes of a single transaction is:

a code that declares the beginning of the transaction;
a select operation; and
a code that declares the ending of the transaction.

Here, the purpose of converting an operation into a single operation transaction is to implement the isolation between the operation and the transaction of the same target data.

Since the target data that the operation needs to access is converted into a single operation transaction when being locked, i.e., an operational access to the distributed database is converted to a transactional access, subsequent processing for a single operational transaction may be implemented with reference to FIG. 5B mentioned above.

For example, an access server commits a lock request on target data to a lock server for a single operation transaction (step 306*b*), the lock server determines that the target data is in a locked state according to a lock record of the target data, and returns that the target data can not be locked currently to an access server (step 307*b*), and the access server blocks the access request of the single operation transaction on the target data, and stores the lock request of the single operation transaction on the target data to a corresponding queue (step 308*b*).

Understandably, when a queue corresponding to the target data does not exist, a queue is established (using cache resources) and a single operation transaction is added. When there is already a transaction in the queue, the single operation transaction is added to the tail of the queue. Since the target data is in the locked state, there is a lock request of at least one transaction in the queue of the target data, here assuming that the queue includes a lock request of the newly added single operation transaction and a lock request of a conventional transaction.

After the storage cluster executes the operations included in the conventional transaction by using running database logic and successfully commits the updated data to the database maintained by the storage cluster, the conventional transaction is ended, the storage cluster sends a lock cancel message on the target data to the lock server (step 309b), and the lock server detects that there is still a lock request of the single operation transaction in the queue, and therefore, transmits a lock notification message on the target data to the storage cluster, so that the storage cluster continues maintaining locking on the target data (step 310b). Unlike locking of the storage server before, target data is locked for a single operation transaction, so that the single operation transaction has an access permission of accessing the target data, and the access to the target data by other transactions and operations is blocked.

The lock server notifies that the access server can commit a single operation transaction to the storage cluster, and the access server commits the single operation transaction to the storage cluster (step 311b).

The storage cluster executes the single operation transaction committed by the access server based on the running database logic (step 312b), after the single operation transaction is ended, the storage cluster sends a lock cancel message on the target data to the lock server (step 313b), and the access server detects that there is no lock request on the target data in the queue, and therefore, can remove a lock record on the target data (step 314b).

In addition, the access server may also return an operation result to the client.

It can be seen that the operation initiated by the client is responded by directly committing to the storage cluster, and since the proportion of operations initiated by the client side often exceeds the proportion of initiated operations, most operations can be directly responded, thereby ensuring the processing efficiency of operations; and when the target data of the operation is locked, the operation is converted into a single operation transaction, and a corresponding lock request is queued to process and access the target data, thereby implementing the isolation between the operation and the transaction.

The above distributed database system can be applied to a distributed relational database and a distributed non-relational database. Taking the non-relational database as an example, the distributed database system can be applied to a distributed key-value storage database, a distributed column storage database, a distributed file database and a distributed graph database.

This kind of databases will mainly use a hash table with a specific key and a pointer pointing to specific data. Taking the distributed key-value database as an example, as for database logic storing data based on a key-value pair form, the key is used as an index of the data, the value is used as a specific value of the data, and a transaction mechanism is generally not supported; when the storage cluster of the distributed database system runs key-value database logic, if the key that the operation needs to access is in a locked state, then the access server arranges the lock request of the key (representing operation) that the operation needs to access in a queue; when receiving a lock cancel message on the key sent by the storage cluster, the access server requests the storage cluster to lock the key again, and commits a transaction to the storage cluster; since the key has been locked, the execution of other operations or transactions can not be inserted in a process of executing the transaction; and after the operation is ended, the storage cluster notifies a lock cancel message to the access server, and the access server notifies that the lock server can remove a lock record of the key.

Figure 6A:
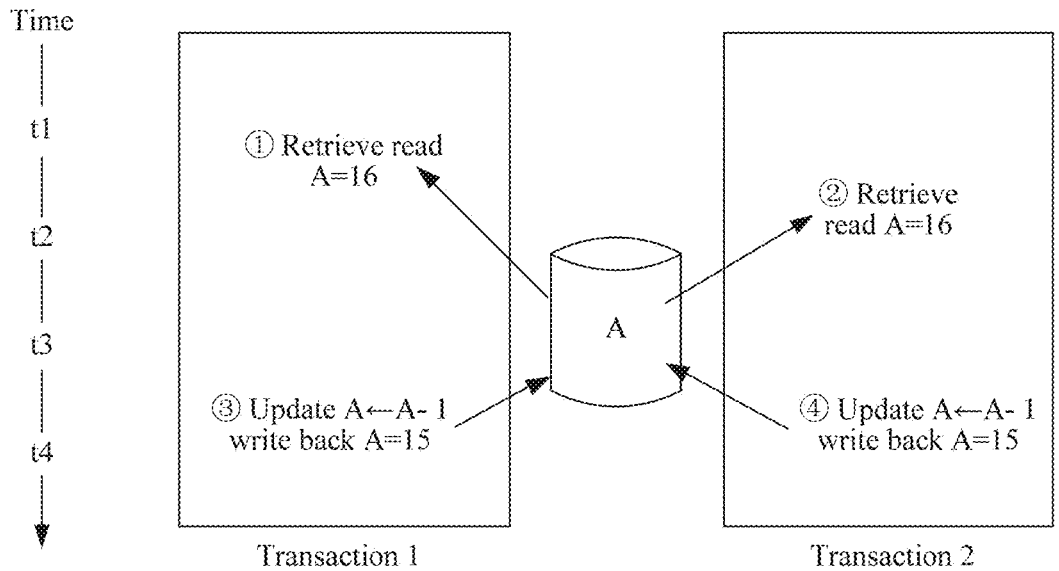
FIG. 6A is an optional diagram of implementing isolation by a transaction operation provided in the embodiments of the present disclosure.

The technical effects of implementing the transaction access in a distributed database system will be described. For example, the isolation of the transaction can avoid the following problems during concurrent operations of transactions:

Problem 1) Lost Modification: as shown in FIG. 6A, two Transactions 1 and 2 read in the same data and modify the data, and a result committed by transaction 2 destroys a result committed by transaction 1, causing the modification of transaction 1 to be lost.

Figure 6B:
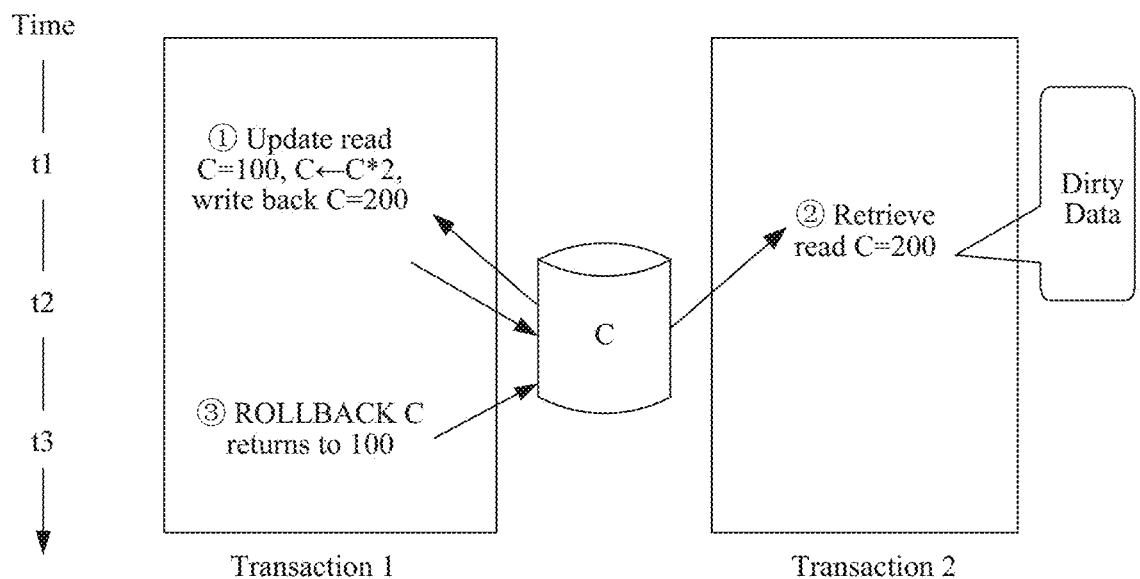
FIG. 6B is another optional diagram of implementing isolation by a transaction operation provided in the embodiments of the present disclosure.

Problem 2) Dirty Read: transaction 1 updates a piece of data, as shown in FIG. 6B, if the commission of transaction 1 (computing A-1) fails, transaction 2 (computing A-1) reads an update result that transaction 1 of the data is not committed, so transaction 2 reads dirty data.

Figure 6C:
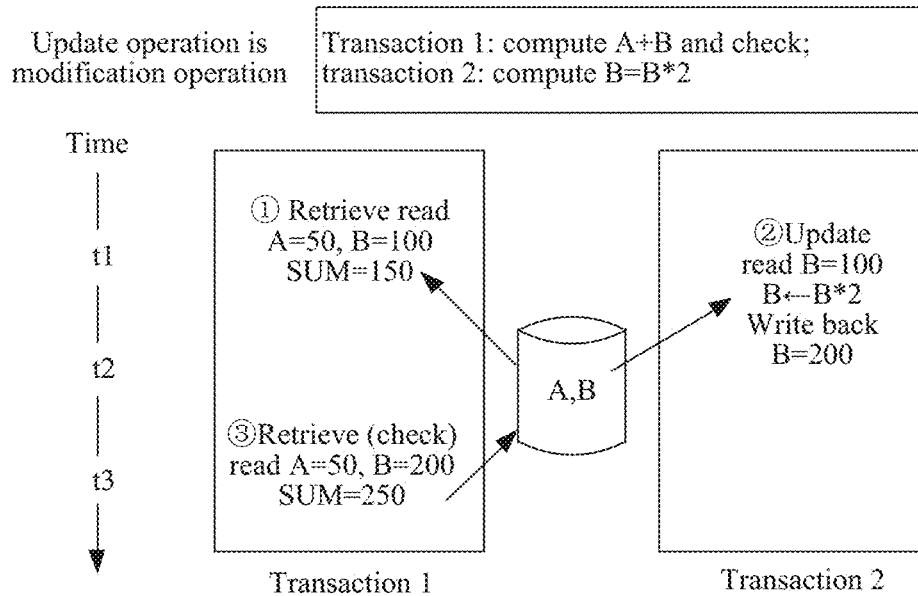
FIG. 6C is still another optional diagram of implementing isolation by a transaction operation provided in the embodiments of the present disclosure.

Problem 3) Non Repeatable Read: in the same transaction, results read from the same data are not the same. For example, for the same data, as shown in FIG. 6C, data read by transaction 2 (computing B=B*2) before transaction 1 (computing A+B and checking) commits updates on the data may be different from data read after commission.

Problem 4) Phantom Read: in the same transaction, multiple returned results from the same query are inconsistent. For example, transaction A adds a record, and transaction B executes a query operation respectively before and after transaction A is committed, detecting that there is one more record in the later operation than the previous operation.

As mentioned earlier, the isolation between transactions is implemented by locking target data of the transactions. In practical applications, different levels of isolation between transactions can be implemented by locking. Exemplarily, the levels of isolation from low to high may include:

Read Committed: only after the update of the transaction on the target data is committed to the database will an update result be accessed by other transactions, which can solve the problem of Dirty Read.

Repeatable Read: in a transaction, read results for the same data are always the same, no matter whether there are other transactions to manipulate this data and whether the transaction commits an operation result on the data, which can solve the problems of Dirty Read and Non Repeatable Read.

Serializable: when transactions are executed in a serialized manner, the isolation level is the highest, but the concurrence of the database is sacrificed, which can solve all problems of concurrent transactions on the same target data.

There is an inverse relationship between the level of isolation between transactions and the throughput of concurrent transactions. The isolation of more transactions may result in higher conflicts and more transaction abortions, the aborted transactions consume resources, and these resources are re-accessed; and therefore, an appropriate isolation level of the transactions is selected according to the performance requirement for the distributed database.

Figure 7:
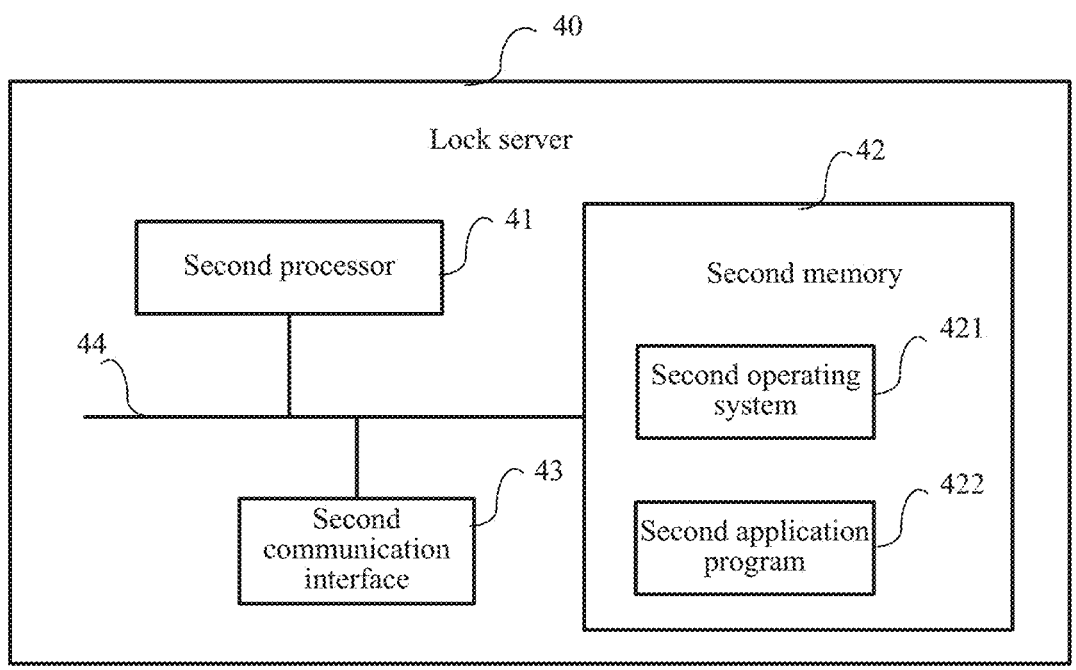
FIG. 7 is an optional hardware structure diagram of a lock server provided in the embodiments of the present disclosure.

As an example, referring to FIG. 7, an optional hardware structure diagram of an aforementioned lock server according to the embodiments of the present disclosure is shown. Since the lock server constitutes an aforementioned lock service layer, all functions implemented by the lock server in a transaction processing implementation solution can be understood according to the foregoing description of the lock service layer.

The lock server 40 shown in FIG. 7 includes: a second processor 41, a second memory 42, a second communication interface 43 and a second bus system 44. The various components in the lock server 40 are coupled together by the second bus system 44. It can be understood that the second bus system 44 is configured to implement connections and communications between these components. The second bus system 44 includes a power bus, a control bus and a status signal bus in addition to a data bus. However, for clarity, various buses are marked as the second bus system 44 in FIG. 7.

It can be understood that the second memory 42 may be a volatile memory or a non-volatile memory, and may also include both volatile and non-volatile memories. The non-volatile memory may be an ROM or PROM. The second memory 42 described in the embodiments of the present disclosure is intended to include but not limited to these and any other suitable types of memories.

The second memory 42 in the embodiments of the present disclosure is configured to store various types of second application programs 422 and a second operating system 421 to support the operation of the lock server 40.

The transaction processing method disclosed in the embodiments of the present disclosure can be applied to the second processor 41, or implemented by the second processor 41. The second processor 41 may be an integrated circuit chip having signal processing capabilities. In the implementation process, each step of the above method may be completed by an integrated logic circuit of hardware in the second processor 41 or an instruction in the form of logic. The above-mentioned second processor 41 may be a general-purpose processor, a DSP, or another programmable logic device, discrete gate or transistor logic device, a discrete hardware component, or the like.

The second processor 41 may implement or execute the method, steps and logic block diagrams provided in the embodiments of the present disclosure. The general-purpose processor may be a microprocessor or any conventional processor or the like. A module may be located in a storage medium, the storage medium being located in the second memory 42. The second processor 41 reads information in the second memory 42 and completes the steps of the foregoing method in combination with its hardware.

Figure 8:
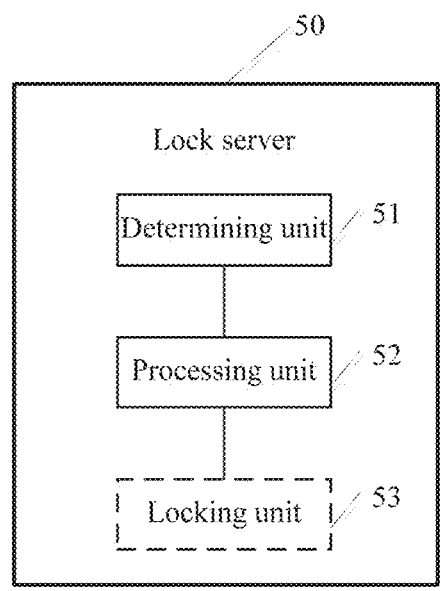
FIG. 8 is an optional composition structure diagram of a lock server provided in the embodiments of the present disclosure.

As an example, referring to FIG. 8, an optional composition structure diagram of a lock server is shown. The lock server 50 shown in FIG. 8 includes: a determining unit 51, configured to determine a status of target data according to a lock record of the target data that a transaction initiated by a client needs to access; and a processing unit 52, configured to respond to a lock request of the transaction on the target data, or block the lock request of the transaction on the target data, and store the lock request to a queue corresponding to the target data for queuing.

In an optional implementation manner, the determining unit 51 is configured to determine that the target data is in a locked state when a lock record of the target data is found; and determine that the target data is not in the locked state when no lock record of the target data is found.

In an optional implementation manner, the processing unit 52 is configured to open a permission of accessing the target data in a manner of executing the transaction and block a permission of accessing the target data in a manner other than executing the transaction, when determining that the target data is not in the locked state.

In an optional implementation manner, the processing unit 52 is further configured to commit the transaction when determining that the target data is not in the locked state.

In an optional implementation manner, the processing unit 52 is further configured to form a lock record of the target data when the target data is not in the locked state, and remove the lock record of the target data when the execution of the transaction is completed.

In an optional implementation manner, the processing unit 52 is further configured to commit, when it is determined that the target data is not in the locked state and the execution of a historical transaction on the target data is completed, the transaction corresponding to the lock request in the queue until the execution of the committed transaction is completed and the queue is empty.

In an optional implementation manner, the lock server further includes:

a locking unit 53, configured to lock the target data, the target data being data that the transaction corresponding to the lock request in the queue needs to access.

It should be noted that when the lock server provided by the above embodiments performs transaction processing, only examples of the division of the above program modules are illustrated; and in practical applications, the above processing may be completed by different program modules according to needs, i.e., the internal structure of the device is divided into different program modules to complete all or some of processing in the foregoing description. The determining unit 51, the processing unit 52 and the locking unit 53 may be an integrated circuit chip having transaction processing capabilities. The above-mentioned units may respectively be a general-purpose processor, a DSP, or another programmable logic device, discrete gate or transistor logic device, a discrete hardware component, or the like.

In the embodiments of the present disclosure, an optional process of processing of the lock server on a transaction initiated by the client is as follows:

determining a status of target data according to a lock record of the target data that a transaction initiated by a client needs to access, and responding to a lock request of the transaction on the target data, or blocking the lock request of the transaction on the target data, and storing the lock request to a queue corresponding to the target data for queuing.

The embodiments of the present disclosure will be described below in conjunction with a specific example.

In a scenario where a consumer uses a smartphone to shop on an online shopping platform and makes a payment to a merchant.

Before transaction 1, the account balance of the consumer recorded in a database running in a storage server 21 is 10; and during transaction 1, the consumer determines a commodity of which the purchase price is 10, a client of the on-line shopping platform calls out a payment client and transfers payment parameters, including payment amount and a merchant account, and the payment client commits, after performing payment authentication on the user, transaction 1 to a distributed database system of a payment background. As an example, transaction 1 includes the following database operations:

Operation 1, transferring an amount 10 from the consumer account; and operation 2, transferring an amount 10 to the merchant account.

Taking the distributed database system shown in FIG. 3A as an example, an access server 22 firstly responds to the transaction committed by the payment background (as for the distributed database system, the on-line payment platform can be regarded as a client), and transfers transaction 1 to a lock server 23.

The lock server 23 queries whether data (namely target data) of the consumer account and the merchant account has a corresponding lock record according to the transaction transferred by the access server 22. Whether the balances of the consumer account and the merchant account are locked (i.e., have a corresponding lock record) is described below.

Firstly, for the situation of both having no lock record

The lock server 23 notifies the access server 22 of the situation of having no lock record, the access server 22 commits operation 1 included in the transaction to a storage server 21 storing data of the consumer account, and database logic running on the storage server 21 updates the balance of the consumer account according to operation 1 and changes the balance to 0; then operation 2 included in the transaction is committed to the storage server 21 storing the balance of the merchant account, the database logic running on the storage server 21 updates the balance of the consumer account according to operation 1, and increases the balance of the merchant account by 10; and the access server 22 gives a feedback that the execution of the transaction is completed to the payment platform according to a result that the operation of the storage server 21 is successful, the payment platform returns payment success to the on-line shopping platform, and the on-line shopping platform updates a shopping state to paid.

It should be noted that when the storage server 21 updates data of the consumer account and the merchant account, since the lock server 23 notifies the storage server 21 to only execute the operation of the current transaction on the data of the consumer account and the merchant account, other transactions or operations are blocked, thereby effectively avoiding the bug of repeated purchasing in a subsequent transaction. For example, after transaction 1, if the consumer initiates transaction 2 and also purchases a commodity of which the price is 10, then a database operations included in corresponding transaction 2 are:

Operation 3, transferring an amount 10 from the consumer account; and operation 4, transferring an amount 10 to the merchant account.

Transaction 2 will be still committed to the access server 22, and since transaction 1 exclusively manipulates the account data of the consumer and a merchant, transaction 2 will be blocked into a queue; after transaction 1 is completed, the lock server 23 cancels a lock record of the account data of the consumer and the merchant on transaction 1 and continues locking the account data of the consumer and the merchant for transaction 2 in the queue, and the access server 22 continues executing transaction 2 for the data of the consumer account and the merchant account; and since the balance of the consumer account is 0, transaction 2 can not be completed, the payment platform returns an error code of insufficient balance to the on-line shopping platform, and the on-line shopping platform feeds back an error message such as insufficient balance.

In the above process, the lock server 23 locks the account data of the consumer and the merchant for transaction 1, thereby avoiding the situation that transaction 2 may be responded prior to transaction 1 such that the consumer spends the same sum of money twice.

Secondly, for the situation having a lock record

In the situation that the consumer account or merchant account has a corresponding lock record, which indicates that the consumer or merchant has an uncompleted historical transaction, for example, a database operation of transferring money to the merchant for a commodity purchased by the consumer before has not been completed, the lock server 23 will block transaction 1 and add transaction 1 to a queue of account balance data of the consumer account and the merchant account.

When the access server 22 finishes executing the historical transaction on the data of the consumer account and the merchant account, the lock server 23 notifies the access server 22 to continue manipulating the data stored in the storage server 21 for transaction 1 in the queue.

As mentioned above, if the current balance of the consumer account is less than 10, the online shopping platform will prompt the situation of insufficient balance, thereby avoiding the payment bug occurring when transaction 1 is firstly executed under the condition that the execution of the historical transaction is not completed.

The embodiments of the present disclosure have the following beneficial effects:

1) Target data that a transaction needs to access is locked, so that only a current responding transaction can manipulate the target data, for example, after the target data is locked for transaction 1, only transaction 1 can access the target data, even if a client initiates a transaction of the same target data, because the transaction does not have a permission to access the target data, conflicts caused by manipulating the target data by other operations or operations are avoided, thereby implementing the isolation between transactions.

2) Similarly, target data in a locked state can not be accessed by operations initiated by the client subsequently, so the possibility of accessing the target data by other inserted operations when executing the operation included in the transaction is avoided, thereby implementing atomicity of the transaction.

3) If it is detected that there is no lock request in the queue of data, and then the lock server can be notified to remove the locked state of data 1. Because all the transactions in the queue have been responded and the target data is "monopolized" in a responding process of each transaction, the isolation between transactions and the atomicity of the transactions are ensured.

4) The operation initiated by the client is responded by directly committing to the storage cluster, and since the proportion of operations initiated by the client side often exceeds the proportion of initiated operations, most operations can be directly responded, thereby ensuring the processing efficiency of operations; and when the target data of an operation is locked, the operation is converted into a single operation transaction, and a corresponding lock request is queued to process and access the target data, thereby implementing the isolation between the operation and the transaction.

A person of ordinary skill in the art may understand that, all or a part of the steps of the foregoing method embodiments may be implemented by a program instructing relevant hardware. The foregoing program may be stored in a computer readable storage medium. When the program runs, the foregoing steps of the method embodiments are executed. The foregoing storage medium includes various mediums capable of storing program codes, such as a mobile storage transaction processing device, an RAM, an ROM, a magnetic disk, or an optical disk.

Alternatively, when the integrated unit of the present disclosure is implemented in a form of a circuitry and sold or used as an independent product, the integrated unit also may be stored in a computer readable storage medium. The foregoing storage medium includes: any media that can store program code, such as a mobile storage transaction processing device, an RAM, an ROM, a magnetic disk, or an optical disc.

The respective logic or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by hardware, integrated circuits, and/or a combination of hard and software. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, memory, circuitry, and/or central processing unit(s).

The foregoing descriptions are merely specific implementation manners of the present disclosure, but are not intended to limit the protection scope of the present disclosure. Variations or replacements readily figured out by any person skilled in the art within the technical scope disclosed in the present disclosure shall fall within the protection scope of the present disclosure. Therefore, the protection scope of the present disclosure shall be subject to the protection scope of the claims.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

What is claimed is:

1. A distributed database system, comprising:
a storage layer executable by a processor to partition data and store the partitioned data in a distributed database;
an access layer executable by a processor to:
commit an initiated operation for target data to the storage layer,
in response to failure to execute the initiated operation by the storage layer, convert the initiated operation into a single operation transaction, wherein the single operation transaction includes a first code declaring a beginning of the single operation transaction, a second code declaring an ending of the single operation transaction, and the initiated operation as an only operation of the single operation transaction;
generate a lock request to lock the target data included in the partitioned data for the single operation transaction converted from the initiated operation; and
a lock service layer executable by a processor to:
identify, based on the lock request, a lock status for the target data according to a lock record for the target data,
lock, in response to the lock status being in an unlocked state, the target data, and
block, in response to the lock status being in a locked state, the lock request and store the lock request in a queue.

2. The distributed database system of claim 1, wherein the lock service layer is further executable by the processor to:
determine that the lock status for the target data is in the locked state in response to generation of the lock record for the target data; and
set the lock status for the target data to the unlocked state in response to detection that the lock record was deleted.

3. The distributed database system of claim 1, wherein the lock service layer is further executable by the processor to:
determine that the lock status for the target data is no longer in the locked state;
dequeue the lock request corresponding to the single operation transaction;
set the lock status for the target data to the locked state;
instruct the access layer to commit the single operation transaction to the storage layer,
permit the storage layer is further executable by the processor to access the locked target data in response to execution of the single operation transaction.

4. The distributed database system of claim 1, wherein the access layer is further executable by the processor to commit, in response to determination that the lock status for target data is in the locked state and the storage layer has completed execution of a historical transaction on the target data, the single operation transaction corresponding to the lock request.

5. The distributed database system of claim 1, wherein the lock service layer is further executable by the processor to generate the lock record for the target data when the lock status for target data is not in the locked state, and remove the lock record for the target data when the storage layer has completed the execution of the single operation transaction.

6. The distributed database system of claim 1, wherein the lock service layer is further executable by the processor to instruct, in response to determination that the target data is no longer in the locked state and the storage layer has completed execution of a historical transaction on the target data, the access layer to commit the single operation transaction corresponding to the lock request stored in the queue to the storage layer.

7. The distributed database system of claim 6, wherein the lock service layer is further executable by the processor to instruct the storage layer to lock the target data.

8. The distributed database system of claim 1, wherein the lock service layer executable by the processor is further configured to:
notify, in response to determination that the lock status for the target data is no longer in the locked state, the storage layer that access to the target data is allowed only during execution of the single operation transaction.

9. A database transaction processing method, comprising:
committing an initiated operation for target data to a storage layer executable by a processor to partition data and store the partitioned data in a distributed database;
in response to failure to execute the initiated operation by the storage layer, converting the initiated operation into a single operation transaction, wherein the single operation transaction includes a first code declaring a beginning of the single operation transaction, a second code declaring an ending of the single operation transaction, and the initiated operation as an only operation of the single operation transaction;

generating a lock request in response to receipt of the single operation transaction;

determining the target data is in a locked state based on a lock record for the target data;

in response to determination that the target data is in the locked state:
  blocking execution of the single operation transaction
  storing the lock request in a queue corresponding to the target data.

10. The database transaction processing method of claim 9, wherein determining the target data stored in a distributed database is in a locked state further comprises:
  identifying a lock record corresponding to the target data; and
  determining that the target data is in the locked state in response to identification of the lock record.

11. The database transaction processing method of claim 9, wherein blocking execution of the transaction further comprises:
  denying a permission to access the target data with the single operation transaction in response to concurrent execution of a previous transaction configured to access the target data.

12. The database transaction processing method of claim 9, wherein the method further comprises:
  determining the target data stored in a distributed database is no longer in the locked state based on a lock record of the target data; and
  committing the single operation transaction in response to the determination that the target data is not in the locked state.

13. The database transaction processing method of claim 9, wherein the method further comprises:
  generating a lock record for the target data when the target data is not in the locked state; and
  deleting the lock record for the target data when the execution of the single operation transaction is completed.

14. The database transaction processing method of claim 13, wherein the method further comprises:
  determining the target data stored in a distributed database is no longer in a locked state based on a lock record of the target data; and
  determining that execution of a historical transaction on the target data is completed;
  committing, in response to determination that the target data is no longer in the locked state and the execution of the historical transaction on the target data is completed, the single operation transaction corresponding to the lock request stored in the queue.

15. The database transaction processing method of claim 14, wherein the method further comprises:
  determining the target data stored in a distributed database is no longer in a locked state based on a lock record of the target data; and
  dequeueing the lock request in response to determination that the target data stored in the distributed database is no longer in the locked state; and
  locking the target data based on the lock request.

16. The database transaction processing method of claim 9, further comprising:
  in response to determination that the lock status for the target data is no longer in the locked state, notifying the storage layer that access to the target data is allowed only during execution of the single operation transaction.

17. A lock server comprising:
  a processor, the processor configured to:
  receive a lock request to lock target data accessed to execute a single operation transaction converted from an initiated operation for the target data in response to failure to execute the initiated operation by a storage layer configured to store partitioned data in a distributed database, the partitioned data comprising the target data, and the single operation transaction including a first code declaring a beginning of the single operation transaction, a second code declaring an ending of the single operation transaction, and the initiated operation as an only operation of the single operation transaction;
  determine, based on a lock record for the target data, that the target data is in a locked state;
  block, in response to the target data being in the locked state, execution of the single operation transaction; and
  store the lock request in a queue corresponding to the target data.

18. The lock server according to claim 17, wherein the processor is further configured to
  identify the lock record for the target data;
  determine that the target data is in a locked state in response to identification of the lock record; and
  determine that the target data is no longer in the locked state in response to deletion of the lock record.

19. The lock server according to claim 17, wherein the processor is further configured to deny a permission to access the target data in accordance with the single operation transaction in response to execution of a previous database transaction.

20. The lock server according to claim 17, wherein the processor is further configured to commit the single operation transaction in response to determination that the target data is no longer in in the locked state.

* * * * *